(12) United States Patent
Sasaki

(10) Patent No.: US 6,301,077 B1
(45) Date of Patent: Oct. 9, 2001

(54) THIN FILM MAGNETIC HEAD AND METHOD OF MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/298,179

(22) Filed: Apr. 23, 1999

(30) Foreign Application Priority Data

Apr. 28, 1998 (JP) .................................................. 10-118907

(51) Int. Cl.⁷ ..................................................... G11B 5/147
(52) U.S. Cl. .............................................................. 360/126
(58) Field of Search ..................... 360/113, 121, 360/125, 126

(56) References Cited

U.S. PATENT DOCUMENTS

| | | | |
|---|---|---|---|
| 4,100,584 | * 7/1978 | Behr et al. ............................. | 360/125 |
| 5,701,221 | * 12/1997 | Taniyama et al. .................... | 360/126 |
| 5,966,277 | * 10/1999 | Koshikawa et al. ................. | 360/126 |
| 6,018,862 | * 2/2000 | Stageberg et al. ................... | 360/126 |
| 6,072,672 | * 6/2000 | Westwood ............................ | 360/317 |
| 6,104,574 | * 8/2000 | Takano et al. ........................ | 360/126 |

* cited by examiner

*Primary Examiner*—Allen T. Cao
(74) *Attorney, Agent, or Firm*—Oliff & Berridge, PLC

(57) ABSTRACT

A thin film magnetic head having a good property and neither saturation nor leakage of a magnetic flux at a connection portion between a pole chip defining a record track width and a yoke portion is manufactured with a high yield and low cost. On a first magnetic layer formed on a substrate, is formed a magneto-resistive element embedded within a shield gap layer, a second magnetic layer constituting a top magnetic shield as well as a bottom pole is formed on the shield gap layer, and a first inorganic insulating layer having a given pattern and a write gap layer are successively formed thereon. A seed layer made of a conductive magnetic material is formed, a third magnetic layer constituting the pole chip is selectively formed by electroplating using the seed layer as an electrode, and a conductive layer constituting a thin film coil is formed by electroplating of copper while the seed layer is also used as an electrode. Then, portions of the seed layer are removed by ion beam etching, a second inorganic insulating layer supporting the thin film coil in an insulated and isolated manner is formed, a second layer thin film coil is formed, and a fourth magnetic layer is formed thereon such that a front end thereof is retarded from an air bearing surface. The air bearing surface is polished on the basis of a reference position of throat height zero defined by an inner edge of the first inorganic insulating layer on the side of the air bearing surface.

21 Claims, 11 Drawing Sheets

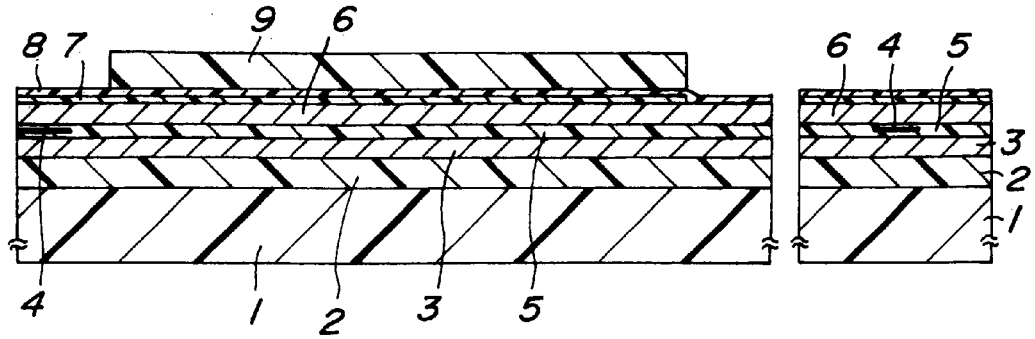
FIG. 4A PRIOR ART  FIG. 4B PRIOR ART
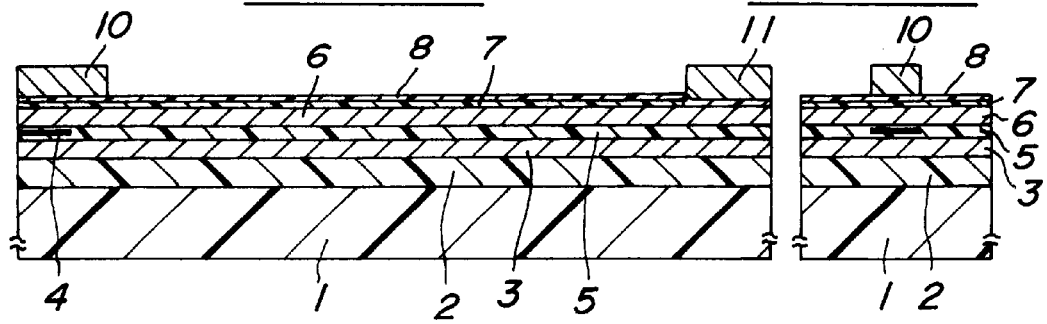
FIG. 5A PRIOR ART  FIG. 5B PRIOR ART
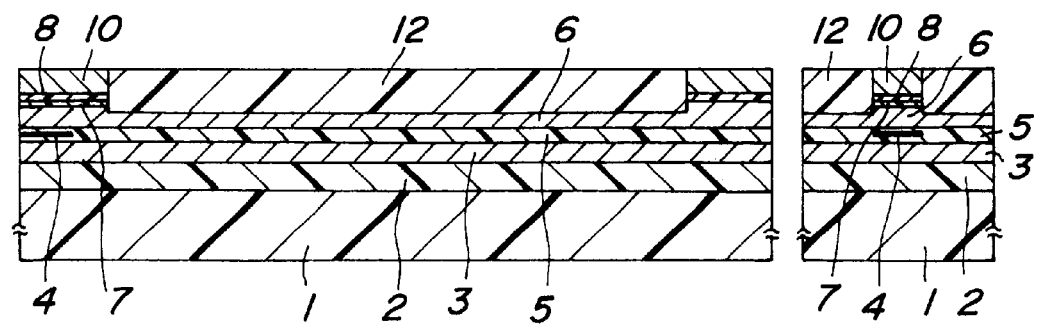
FIG. 6A PRIOR ART  FIG. 6B PRIOR ART

FIG. 7A PRIOR ART
FIG. 7B PRIOR ART
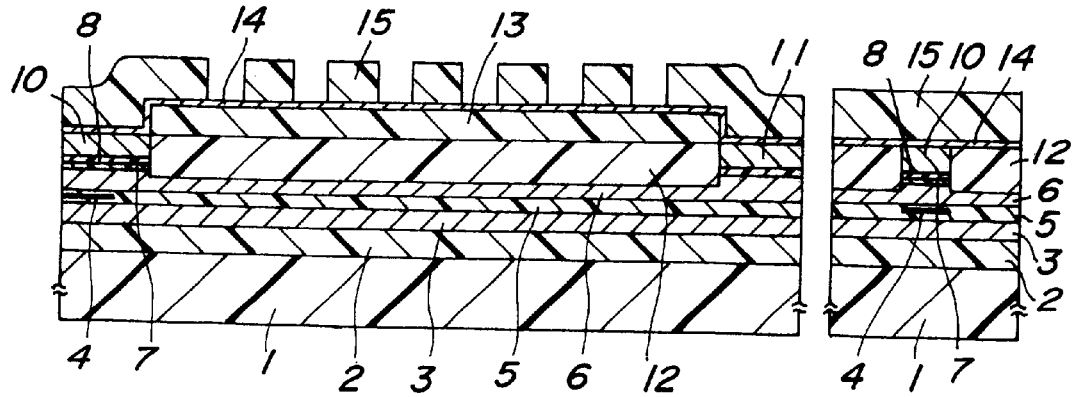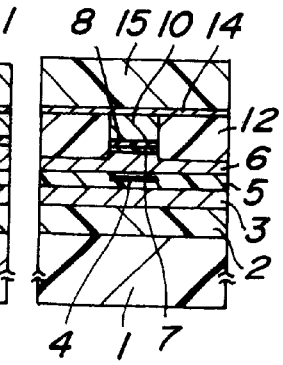
FIG. 8A PRIOR ART
FIG. 8B PRIOR ART
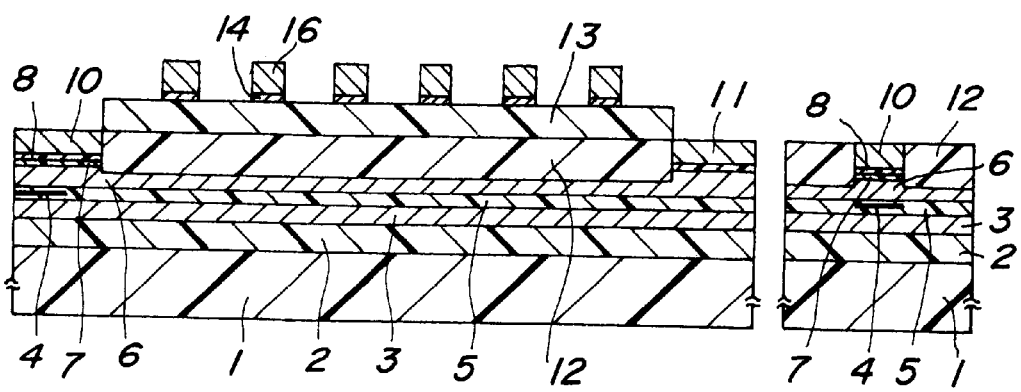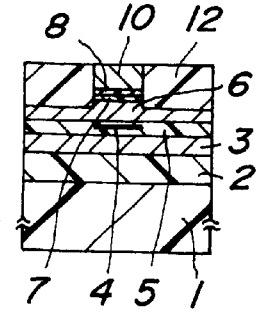
FIG. 9A PRIOR ART
FIG. 9B PRIOR ART
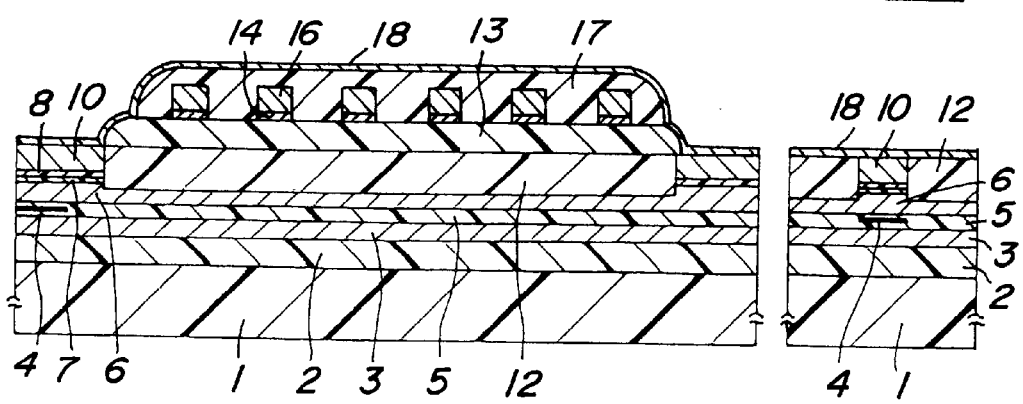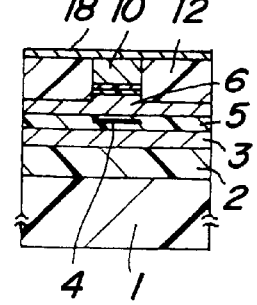

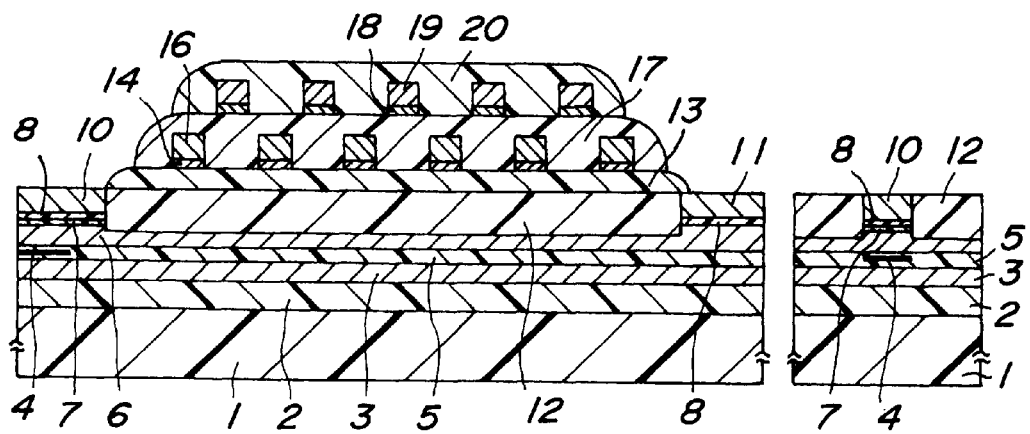
FIG.10A PRIOR ART
FIG.10B PRIOR ART
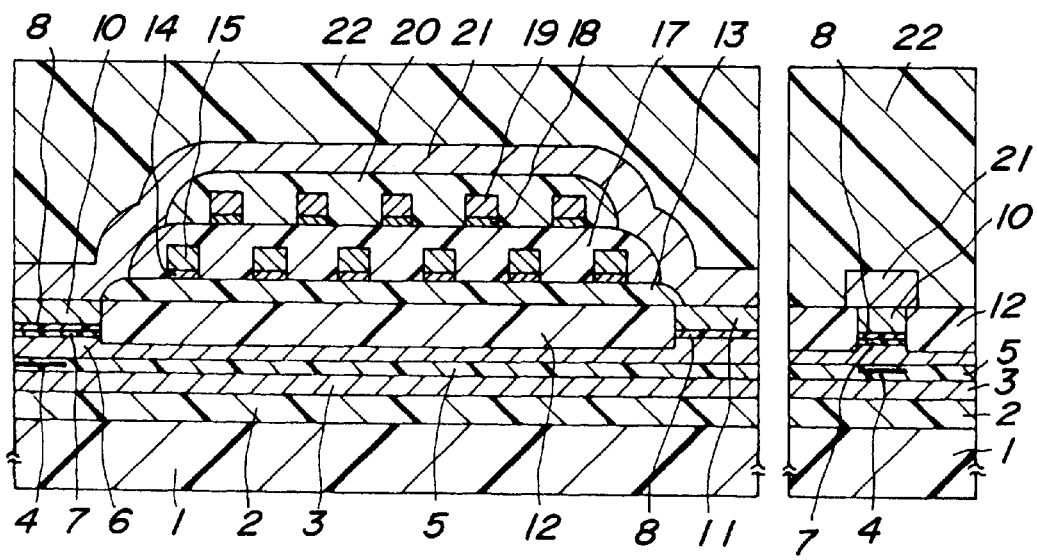
FIG.11A PRIOR ART
FIG.11B PRIOR ART

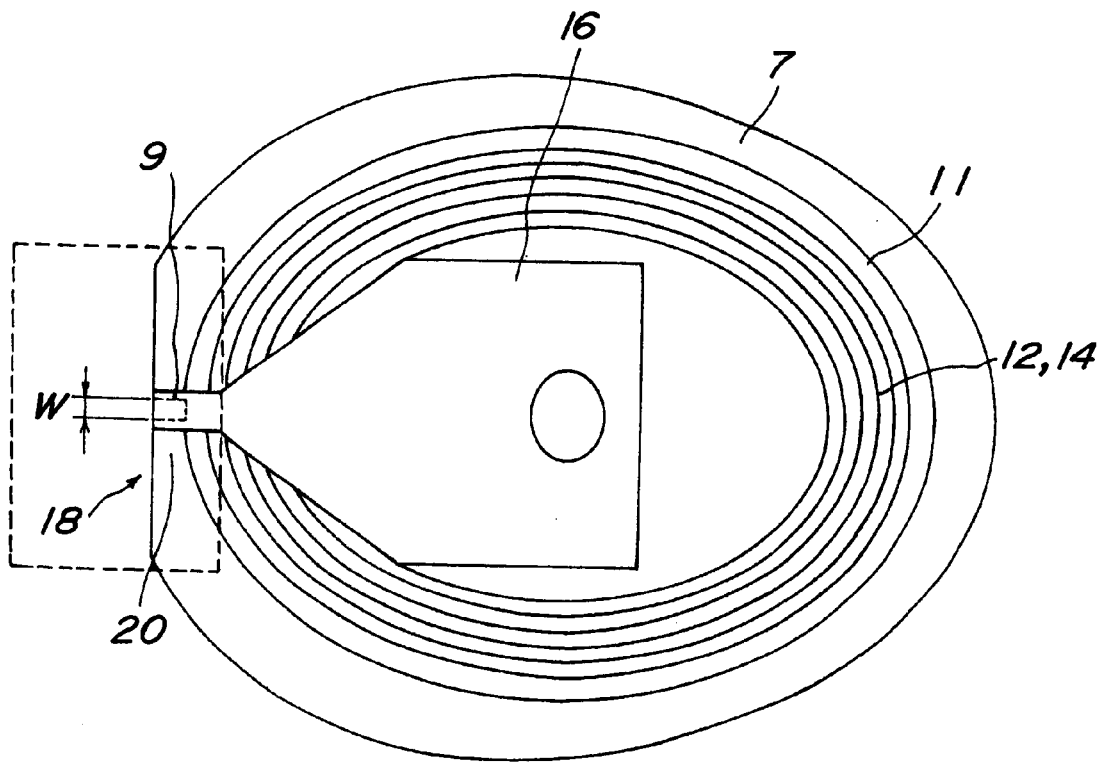
FIG_14
PRIOR ART

FIG._15A   FIG._15B
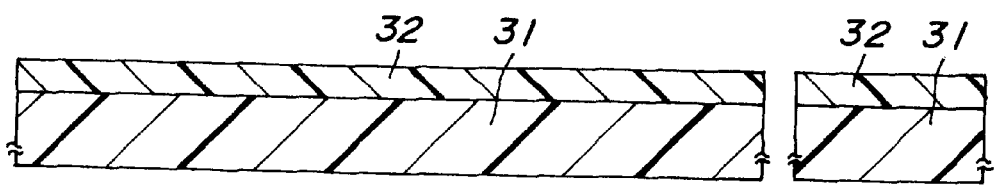
FIG._16A   FIG._16B
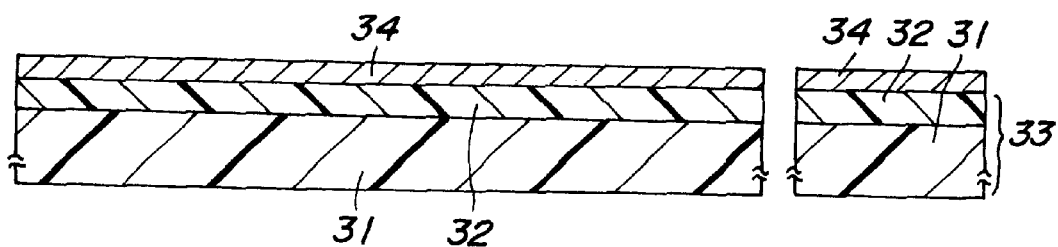
FIG._17A   FIG._17B
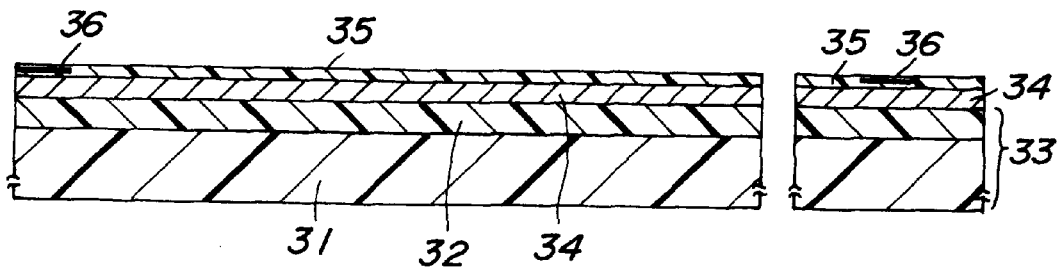

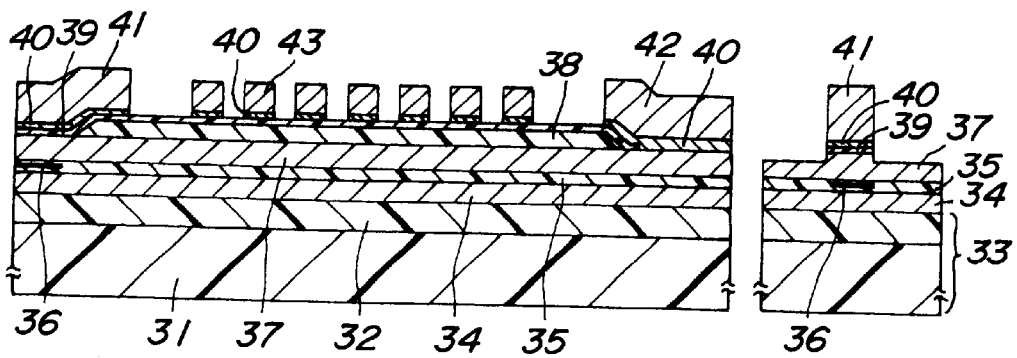
FIG_21A   FIG_21B
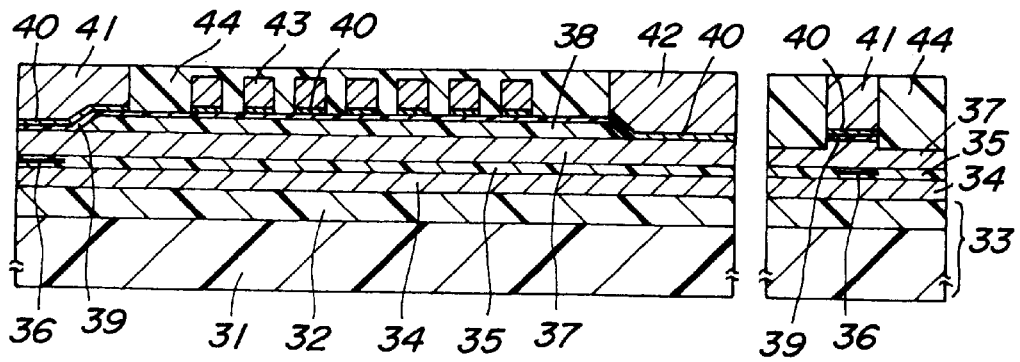
FIG_22A   FIG_22B
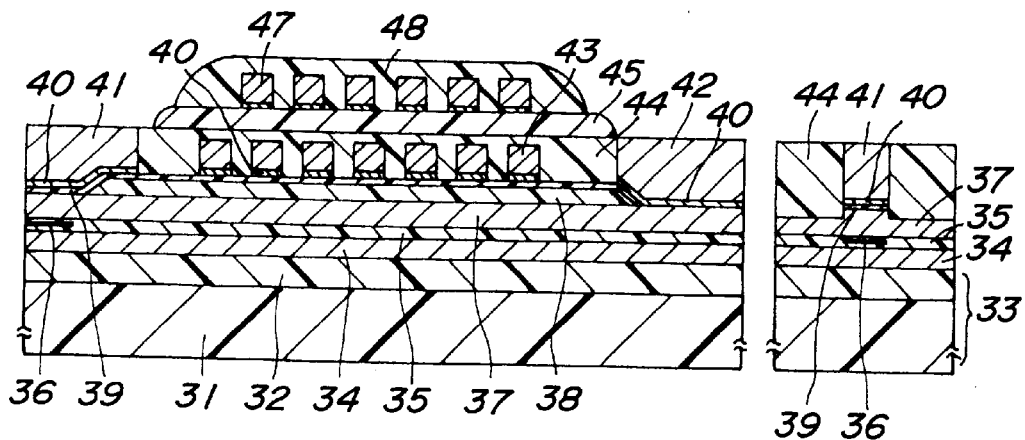
FIG_23A   FIG_23B

FIG_24A
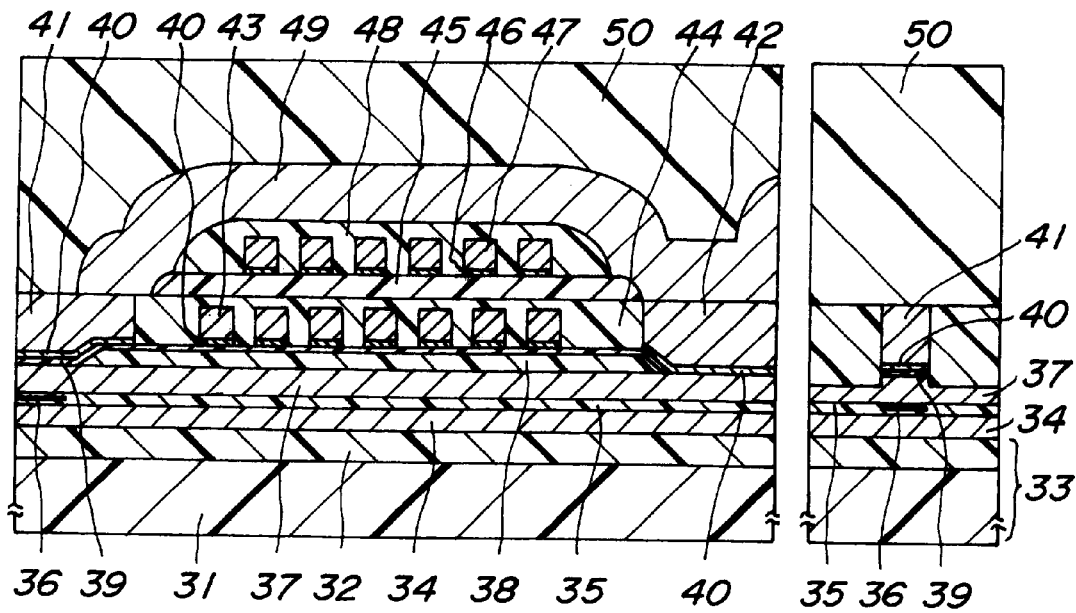
FIG_24B
FIG_25
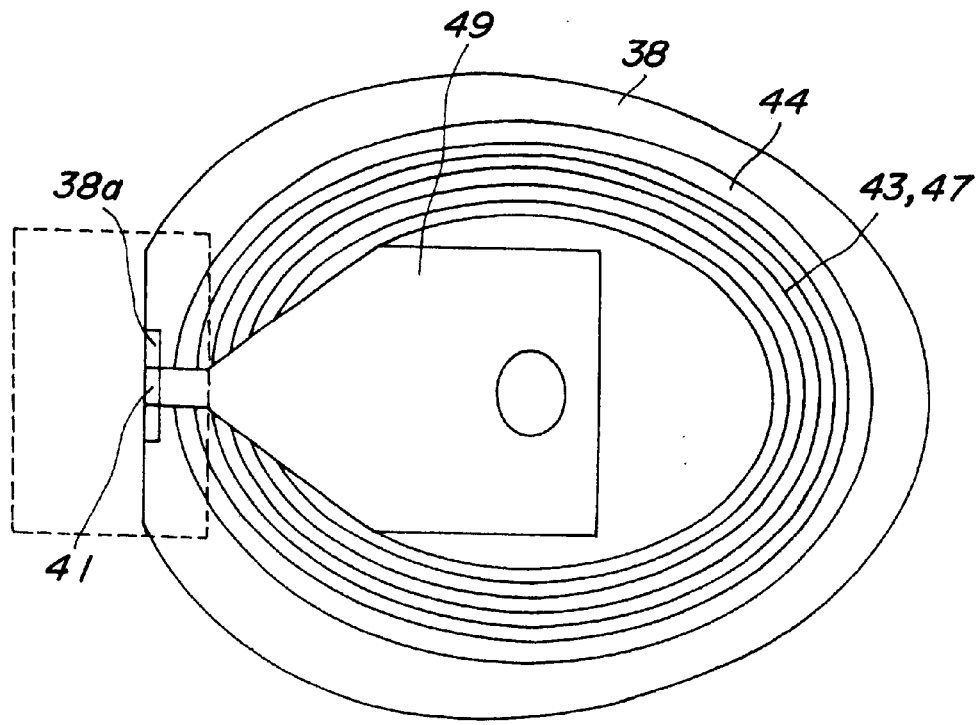

FIG_26
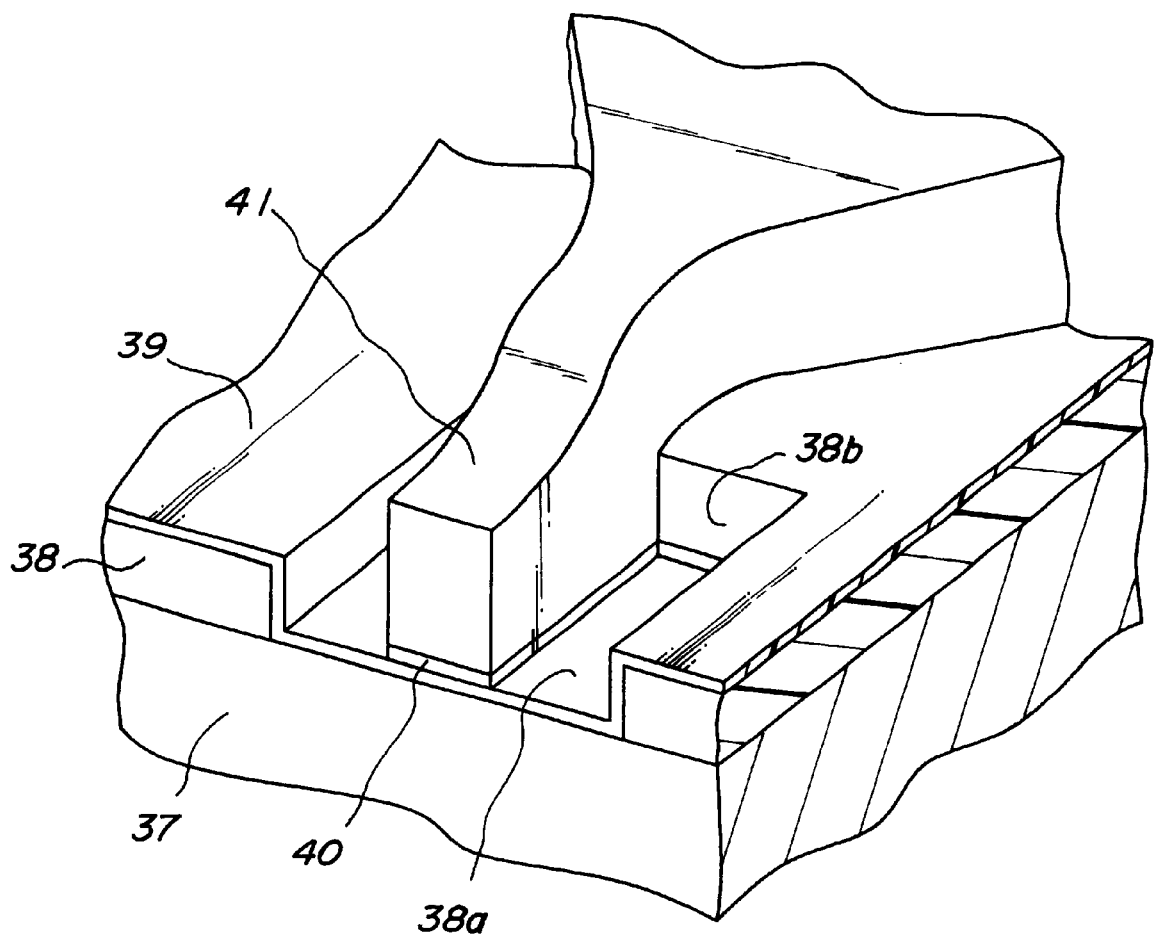

THIN FILM MAGNETIC HEAD AND METHOD OF MANUFACTURING THE SAME

BACKGROUND OF THE INVENTION

1. Field of the Invention

The present invention relates to a thin film magnetic head for writing and a method of manufacturing the same, and more particularly relates to a combination type thin film magnetic head including an inductive type thin film magnetic head for writing and a magnetoresistive type magnetic head for reading, said magnetic heads being supported by a substrate in a stacked fashion.

2. Description of the Related Art

Recently a surface recording density of a hard disc device has been improved, and it has been required to develop a thin film magnetic head having an improved performance accordingly.

There has been proposed and actually used a combination type thin film magnetic head including an inductive type thin film magnetic head for writing and a magnetoresistive type magnetic head for reading, said magnetic heads being supported by a substrate in a stacked fashion. As the reading magnetic head utilizing the magnetoresistive effect, there has been generally used a reading magnetic head utilizing an anisotropic magnetoresistive (AMR) effect, but there has been also developed a magnetic head utilizing a giant magnetoresistive (GMR) effect having a resistance change ratio higher than the normal anisotropic magnetoresistive effect by several times.

In the present specification, these AMR and GMR elements are termed as a magnetoresistive type thin film magnetic head or simply MR reproducing element.

By using the AMR reproducing element, a very high surface recording density of several gigabits per a unit square inch has been realized, and a surface recording density can be further increased by using the GMR element. By increasing a surface recording density in this manner, it is possible to realize a hard disc device which has a very large storage capacity of more than 10 gigabytes and is still small in size.

A height (MR Height: MRH) of a magnetoresistive reproducing element is one of factors which determine a performance of a reproducing head including a magnetoresistive reproducing element. This MR height MRH is a distance measured from an air bearing surface on which one edge of the magnetoresistive reproducing element is exposed to the other edge of the element remote from the air bearing surface. During a manufacturing process of the magnetic head, a desired MR height MRH is obtained by controlling an amount of polishing the air bearing surface.

At the same time, a performance of a recording head has been also required to be improved. In order to increase a surface recording density, it is necessary to make a track density on a magnetic record medium as high as possible. For this purpose, a width of a pole portion at the air bearing surface has to be reduced to a value within a range from several micron meters to several submicron meters. In order to satisfy such a requirement, the semiconductor manufacturing process has been adopted for manufacturing the thin film magnetic head.

One of factors determining a performance of an inductive type thin film magnetic film for writing is a throat height (TH). This throat height TH is a distance of a pole portion measured from the air bearing surface to an edge of an insulating layer which serves to separate electrically a thin film coil from the air bearing surface. It has been required to shorten this distance as small as possible. Also this throat height TH is determined by an amount of polishing the air bearing surface.

In order to improve the performance of the combination type thin film magnetic head including a stack of an inductive type thin film magnetic head for writing and a magnetoresistive type thin film magnetic head for reading, it is important that the inductive type thin film magnetic head for writing and magnetoresistive type thin film magnetic head for reading are formed with a good balance.

FIGS. 1–11 show successive steps of manufacturing a known typical thin film magnetic head, in which A represents a cross sectional view cut along a plane perpendicular to the air bearing surface and B denotes a cross sectional view cut along a plane parallel with the air bearing surface. FIGS. 12–14 are a cross sectional view illustrating a completed thin film magnetic head, a cross sectional view of the pole portion, and a plan view depicting the whole magnetic head. This magnetic head belongs to a combination type thin film magnetic head which is constructed by stacking an inductive type thin film writing magnetic head and a magnetoresistive type thin film reading magnetic head one on the other.

At first, as illustrated in FIG. 1, on a substrate 1 made of, for instance aluminum-titan-carbon (AlTiC), is deposited an insulating layer 2 made of alumina ($Al_2O_3$) and having a thickness of about 5–10 μm.

Then, as depicted in FIG. 2, a first magnetic layer 3 constituting one of magnetic shields for protecting the MR reproducing magnetic head from external magnetic fields is formed to have a thickness of 3 μm on the insulating layer.

Then, after depositing by sputtering a shield gap layer 5 made of an alumina with a thickness of 100–150 nm as shown in FIG. 3, a magnetoresistive layer 4 having a thickness of several tens nano meters and being made of a material having the magnetoresistive effect, and the magnetoresistive layer is shaped into a desired pattern by a highly precise mask alignment.

Next, as represented in FIG. 4, a second magnetic layer 6 made of a permalloy and having a thickness of 3 μm is formed. This magnetic layer 6 serves not only as an upper shield layer for magnetically shielding the MR reproducing element together with the above mentioned bottom shield layer 3, but also as a bottom magnetic layer of the inductive type writing thin film magnetic head to be manufactured later.

Next, after forming, on the second magnetic layer 6, a write gap layer 7 made of a nonmagnetic material such as alumina to have a thickness of about 200 nm and a given pattern, a seed layer 8 made of a magnetic material is formed with a thickness of 50–80 nm and a photoresist 9 is formed thereon in accordance with a given pattern as illustrated in FIG. 4.

Then, an electroplating is performed by using the seed layer 8 as one of electrodes and the photoresist 9 as a mask to deposit selectively a magnetic material having a high saturation magnetic flux density such as a permalloy and iron nitride to form a pole chip 10 as well as a connecting magnetic layer 11 for connecting the second magnetic layer 6 with a third magnetic layer constituting the other pole.

Then, after removing exposed portions of the seed layer 8 by etching, in order to prevent an increase of an effective track width, that is, in order to prevent a spread of a magnetic flux at the lower pole during a writing operation, the gap layer 7 and second magnetic layer constituting the pole portion near the pole chip are removed by an ion beam etching such as an ion milling to form a trim structure. Furthermore, an insulating layer 12 made of alumina is formed to have a thickness of about 3 μm, and then an assembly is flattened by, for instance chemical-mechanical polishing (CMP).

After that, as depicted in FIG. 7, after forming an electrically insulating photoresist layer 11 is formed in accordance with a given pattern by a highly precise mask alignment, a seed layer 14 made of copper is formed on the photoresist layer 11, and then a photoresist layer 15 is formed on the seed layer.

Then, the electroplating is performed by using the seed layer 14 as one of electrodes and the photoresist layer 15 as a mask to deposit copper with a thickness of 2–3 μm to form a first layer thin film coil 16 as depicted in FIG. 8. It should be noted that the thin film coil is formed by the seed layer and copper layer deposited thereon by the electroplating, but for the sake of explanation, the copper layer deposited by the electroplating is referred to as the thin film coil.

Next, as depicted in FIG. 9, an insulating photoresist layer 17 is formed such that the thin film coil 16 is supported in an insulated and isolated manner, a surface of the photoresist layer is flattened by baking at a temperature of, for instance 250–300° C. During this baking, a periphery of the lower insulating layer 13 is also round. Furthermore, in order to form a second layer thin film coil, a seed layer 18 made of copper is formed with a thickness of 50–80 nm on the pole chip 10 and photoresist 17.

Furthermore, after forming a photoresist serving as a mask on the seed layer 18 in accordance with a given pattern, the electroplating is carried out by using the seed layer as one of electrodes and the photoresist as the mask to deposit copper selectively on the seed layer to form a second layer thin film coil 19. After removing the photoresist and exposed portions of the seed layer 18, a photoresist 20 is formed such that the second layer thin film coil is supported thereby in an insulated and isolated manner, and then the sintering is performed at about 250° C. to obtain a flat surface as shown in FIG. 10.

Next as illustrated in FIG. 11, on the pole chip 10 and photoresist layers 13, 17 and 20, a yoke portion 21 constituting the other pole is selectively formed with a thickness of 3 μm in accordance with a given pattern.

This yoke portion 21 is brought into contact with the second magnetic layer 6 at a rear position remote from the pole portion by means of the connecting magnetic layer 11, and therefore the thin film coils 15, 19 pass through a closed magnetic path constituted by the second magnetic layer, pole chip and yoke portion.

Furthermore, an overcoat layer 22 made of an alumina is deposited with a thickness of 20–30 μm on an exposed surface of the yoke portion 21 as well on surfaces of other parts.

Finally, as shown in FIG. 12, a side wall at which the magnetoresistive layer 4, write gap layer 7 and pole chip 10 are formed is polished to form an air bearing surface (ABS) 23 which is opposed to a magnetic record medium. It should be noted that in FIG. 12, the overcoat layer 22 is dispensed with.

During the formation of the air bearing surface 23, the magnetoresistive layer 4 is also polished to obtain an MR reproducing element 24. In this manner, the above mentioned throat height TH and MR height MRH are determined by the polishing. In an actual manufacturing process, contact pads for establishing electrical connections to the thin film coils 15, 19 and MR reproducing element 24 are formed, but these contact pads are not shown in the drawings. FIG. 13 is a cross sectional view of the pole portion of the combination type thin film magnetic head thus manufactured, while the pole portion is cut along a plane parallel with the air bearing surface 23.

As shown in FIG. 12, an angle θ between a straight line S connecting side edges of the photoresist layers 13, 17, 20 isolating the thin film coils 15, 19 and an upper surface of the yoke portion 21 is called an apex angle. This apex angle is one of important factors for determining a property of the thin film magnetic head together with the throat height TH and MR height MRH.

Furthermore, as shown in the plan view of FIG. 14, a width W of the pole chip 10 determines a width of tracks recorded on a record medium, and therefore it is necessary to make this width W as small as possible in order to realize a high surface recording density. Recently, this width has been required in the order to sub-microns. The yoke portion 21 also has a narrow pole portion which is coupled with the pole chip 10, but its width is somewhat larger than the width of the pole chip 10. It should be noted that in the drawing, the thin film coils 15, 19 are denoted to be concentric for the sake of simplicity.

In the known method of manufacturing the thin film magnetic head, there is a special problem in the formation of the top pole after the formation of the thin film coil in a precise manner along the outwardly protruded coil portion, particularly along an inclined portion (Apex) thereof, said coil portion being covered with the photoresist insulating layers.

That is to say, in the known method, upon forming the top pole, after a magnetic material such as permalloy is deposited by plating on the outwardly protruded coil portion having a height of about 7–10 μm, a photoresist is applied to have a thickness of 3–4 μm, and then the photoresist layer is shaped into a given pattern by utilizing the photolithography.

Since a thickness of the photoresist layer provided on the upper portion of the coil portion should be at least 3 μm, the photoresist layer has to be applied such that a portion of the photoresist at a bottom of the outwardly protruded coil portion would have a thickness of about 8–10 μm.

On the other hand, in order to form a narrow track of the recording head near the edges of the photoresist insulating layers (for instance, layers 11 and 13 in FIG. 7), the top pole should be patterned to have a width of about 1 μm. Therefore, it is necessary to form a pattern having a width of 1 μm in the photoresist layer having a thickness of 8–10 μm.

However, when such a narrow pattern having a width of 1 μm is to be formed with the thick photoresist layer having a thickness of 8–10 μm, a top pole which can realize a narrow track could hardly be manufactured accurately due to a deformation of a pattern by light reflection during a light exposure in a photolithography and an inevitable decrease in a resolution caused by a large thickness of the photoresist layer.

In order to mitigate such a problem, as shown in FIGS. 1–14, the top pole is divided into the pole chip 10 and the yoke portion 21 connected therewith, and a width of the pole chip is narrowed to decrease a width of the record track width.

However, the thin film magnetic head, particularly the recording magnetic head formed in the above mentioned manner still has the following problems.

If there is an alignment error in the photolithography for forming the yoke portion 21 on the pole chip 10 having the narrow width W, a center of the pole chip 10 and a center of the pole portion of the yoke portion 20 viewed from the air bearing surface might be shifted relative to each other. If the center of the pole chip 10 is deviated from the center of the pole portion of the yoke portion 20, there might be produced a large leakage of the magnetic flux from the pole portion of the third magnetic layer and data might be written by this leaked magnetic flux. Therefore, an effective track width is increased and data might be recorded in a region other than a desired region into which the data has to be recorded.

In the known thin film magnetic head, the edge of the pole chip 10 opposite to the air bearing surface 23 is used as a reference position of throat height zero. However, since the pole chip has a small width W, the edge of the pole chip is rounded off and therefore a position of the edge of the pole chip might be shifted. In the conventional combination type thin film magnetic head, although the throat height TH and MR height MRH have to be set accurately with reference to the throat height zero position, since the reference position of throat height zero might deviate during the manufacturing process and could not be defined accurately, the thin film magnetic head having desired throat height TH and MR height MRH according to the desired design values could not be manufacture with a high yield.

Moreover, in the known method of manufacturing the thin film magnetic head, the seed layer 8 serving as one of the electrodes for the electroplating for forming the pole chip 10 and the seed layer 14 serving one of the electrodes for the electroplating for forming the first layer thin film coil 15 (2) are formed separately from each other and the steps for removing these seed layers are performed separately. Therefore, the number of manufacturing steps is large, the through put is decreased, and the manufacturing cost is increased.

SUMMARY OF THE INVENTION

The present invention has for its object to provide a thin film magnetic head, in which the undesired recording due to a magnetic flux leaked from the end face of the yoke portion can be prevented by coupling the yoke portion with the pole chip efficiently, and therefore the width of the record track can be narrowed.

It is another object of the invention to provide a thin film magnetic head, in which the reference position of throat height zero can be remained unchanged during the manufacturing process, and therefore even if the pole portion is miniaturized, the thin film magnetic head can have desired recording characteristics.

It is another object of the invention to provide a method of manufacturing the thin film magnetic head, in which a manufacturing process can be simplified, a through put can be improved and a cost can be reduced by using a common seed layer for the formation of pole chip and a thin film coil.

According to the invention, a thin film magnetic head comprises:
- a magnetic layer having a pole portion;
- a pole chip whose end surface constitutes an air bearing surface together with said pole portion of the magnetic layer, said pole chip having a width defining a width of a record track;
- a yoke portion third magnetic layer which is brought into contact with a rear portion of said pole chip apart from the air bearing surface and is magnetically coupled with said magnetic layer at a rear position remote from the air bearing surface;
- a write gap layer interposed between said pole portion of the magnetic layer and said pole chip at least at the air bearing surface;
- a thin film coil having a portion which is supported in an electrically isolated manner between said magnetic layer and said pole chip and yoke portion; and
- a substrate supporting said magnetic layer, pole chip, yoke portion, write gap layer and thin film coil;
- wherein said pole chip comprises a seed layer made of an electrically conductive magnetic material and a magnetic material layer, and said thin film coil comprises a seed layer made of an electrically conductive magnetic material identical with said electrically conductive magnetic material and an electrically conductive material layer.

In the thin film magnetic head according to the invention, since the yoke portion coupled with the pole chip is retained from the air bearing surface, no recording is effected by a magnetic flux leaked from the end face of the yoke portion and a record track width can be narrowed. Furthermore, although a center of the pole chip is deviated from a center of the yoke portion to some extent, writing characteristics are not affected thereby and the manufacturing yield can be improved.

In the thin film magnetic head according to the invention, said electrically conductive magnetic material is preferably a magnetic material selected from the group consisting of NiFe, FeN and an amorphous Fe—Co—Zr, and said magnetic material layer of the pole chip is preferably made of a magnetic material having a high saturation magnetic flux density such as NiFe, FeN and amorphous Fe—Co—Zr. Further, the electrically conductive material layer of the thin film coil is preferably made of a copper.

According to the invention, a method of manufacturing a thin film magnetic head including at least an inductive type thin film magnetic head comprises the steps of:
- forming a magnetic layer having a pole portion extending at least from an air bearing surface such that the magnetic layer is supported by a substrate;
- forming an insulating layer on a portion of said magnetic layer at which a thin film coil is to be formed, such that an edge of said insulating layer on the side of the air bearing surface defines a reference position of throat height zero;
- forming a write gap layer such that a surface of said pole portion of the magnetic layer and a surface of said insulating layer are covered with the write gap layer;
- forming a seed layer made of an electrically conductive material on a surface of the write gap layer;
- electroplating a magnetic material by using said seed layer as one of electrodes to form a pole chip to be opposed to said pole portion of the magnetic layer via said seed layer and write gap layer;
- electroplating an electrically conductive material by using said seed layer as one of electrodes to form a thin film coil above said insulating layer;
- removing selectively portions of said seed layer on which said pole chip and thin film coil are not formed;
- forming an insulating layer such that said thin film coil is isolated by the insulating layer; and
- forming a yoke portion on said insulating layer which supports said thin film coil in an insulated and isolated manner, such that the yoke portion is coupled with said pole chip as well as with said magnetic layer at a rear portion opposite to said air bearing surface.

In the method of manufacturing the thin film magnetic head according to the invention, the seed layer made of an electrically conductive magnetic material is commonly used in the electroplating to form the magnetic material layer of the pole chip as well as the electrically conductive material layer of the thin film coil, and then the seed layer is removed by the single etching process. Therefore, the manufacturing process becomes very simple, the through put is improved and the manufacturing cost can be reduced.

In a preferable embodiment of the method of manufacturing the thin film magnetic head according to the invention, after forming the pole chip, the write gap layer near the pole chip is removed by the reactive ion etching using a Freon or chlorine gas, while the pole chip is used as a mask, and then an exposed portion of the magnetic layer is removed over a part of its thickness by the ion beam etching using an argon gas.

BRIEF DESCRIPTION OF THE DRAWINGS

FIGS. 1A, 1B–11A, 11B are cross sectional views showing successive steps of manufacturing a known combination type thin film magnetic head;

FIG. 14 is a plan view illustrating the known combination type thin film magnetic head after the formation of the yoke portion;

FIGS. 15A, 15B–24A, 24B are cross sectional views showing successive steps of an embodiment of the thin film magnetic head manufacturing method according to the invention;

FIGS. 25 and 26 are plan and perspective views, respectively depicting the condition of the combination type thin film magnetic head according to the invention after the formation of the yoke portion.

DESCRIPTION OF THE PREFERRED EMBODIMENT

Figure 1A:
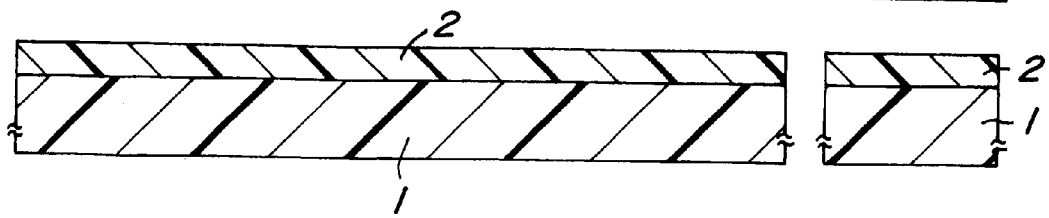
Figure 1B:
Figure 2A:
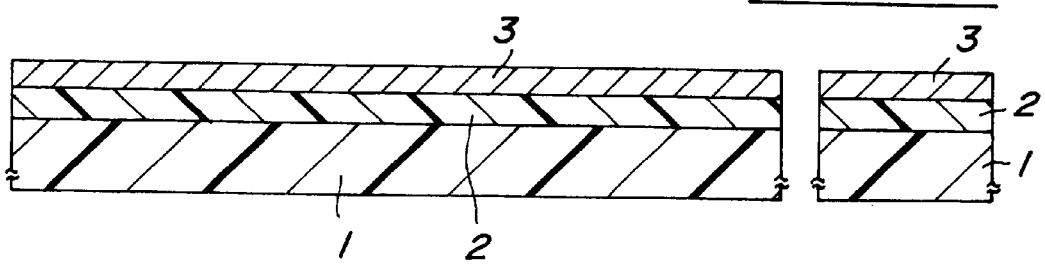
Figure 2B:
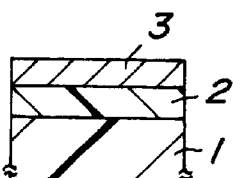
Figure 3A:
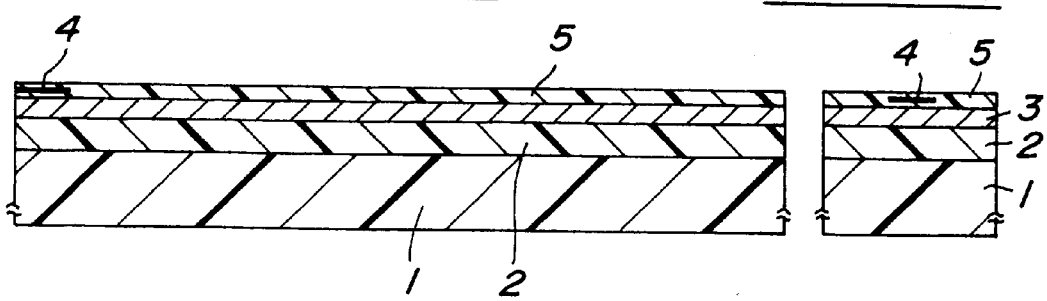
Figure 3B:
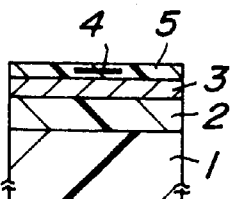
Figure 12:
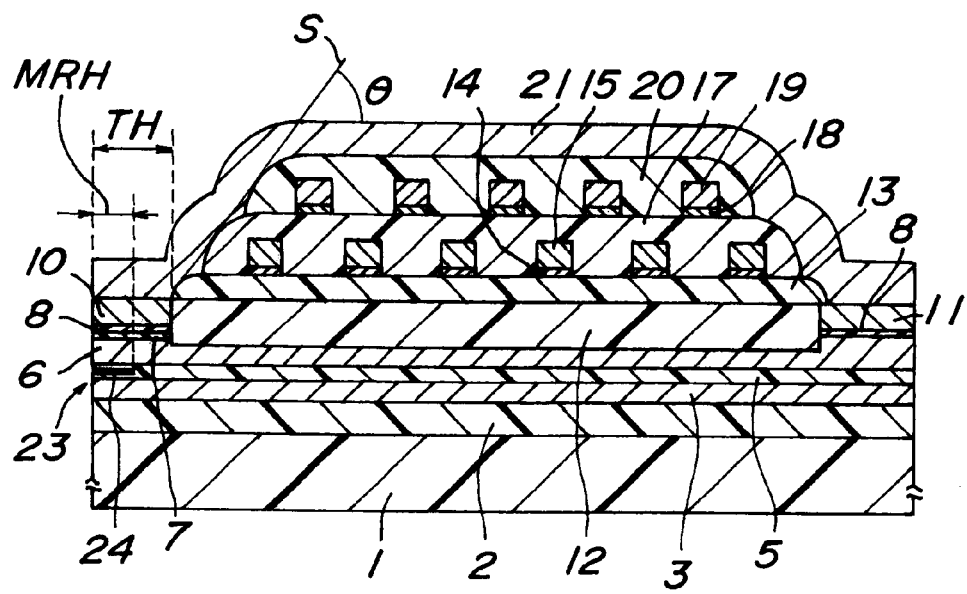
FIG. 12 is a cross sectional view of the finally obtained conventional combination type thin film magnetic head.
Figure 13:
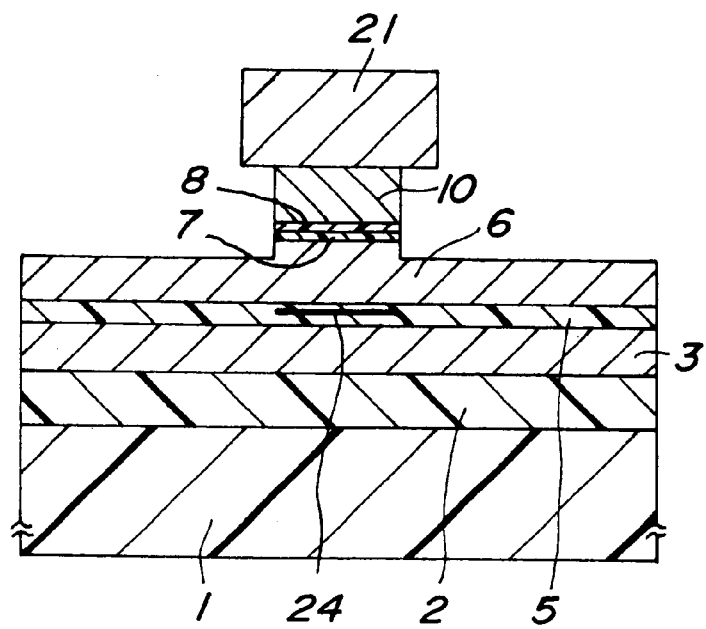
FIG. 13 a cross sectional view showing the pole portion of the known combination type thin film magnetic head.

Now an embodiment of the thin film magnetic head according to the invention and the method of manufacturing the same will be explained with reference to FIGS. 15–26. In these drawings, A represents a cross sectional view cut along a plane perpendicular to an air bearing surface and B illustrates a cross sectional view cut along a plane parallel with the air bearing surface. The thin film magnetic head of the present embodiment is constructed as a combination type thin film magnetic head having a magnetoresistive type thin film magnetic head for reading formed on a substrate and an inductive type thin film magnetic head for writing formed the magnetoresistive type thin film magnetic head.

FIG. 15 shows a condition, in which on a substrate main body 31 made of an AlTiC, is deposited an insulating layer 32 made of an alumina having a thickness of about 3–5 $\mu$m. In the present specification, these substrate main body 31 and insulating layer 32 are called a substrate or wafer 33. Moreover, in the present specification, the insulating layer means a layer which has at least an electrically insulating property, and it may have or may not have a non-magnetic property. However, in general, a material such as alumina which has both the electrical insulating property and the non-magnetic property, and therefore the insulating layer is sometimes used to denote the non-magnetic layer.

Moreover, in an actual manufacturing process, after forming a number of combination type thin film magnetic heads on the wafer in matrix, the wafer is divided into a plurality of bars, a end face of a bar is polished to form air bearing surfaces, and finally the bar is divided into individual combination type thin film magnetic heads. Therefore, in the steps shown in the drawings, an end face of the magnetic head does not appear, but the end face is shown in the front view for the sake of explanation.

Next, as shown in FIG. 16, on the insulating layer 32 of the substrate 33, a bottom shield layer 34 for the magnetoresistive type thin film magnetic head made of a permalloy is formed to have a thickness of about 3 $\mu$m. This bottom shield 34 is formed in accordance with a given pattern by sputtering using a photoresist as a mask.

Next, on the bottom shield layer 34, is formed a GMR layer 36 embedded in a shield gap layer 35 made of an alumina as shown in FIG. 17. The shield gap layer 35 may have a thickness of 0.2 $\mu$m. On the shield gap layer 35 embedding the GMR layer 35, is formed a magnetic layer 37 made of a permalloy with a thickness of 3–4 $\mu$m, said magnetic layer constituting a top shield for the GMR layer as well as the bottom pole for the inductive type thin film magnetic head. Said permalloy may have a composition of Fe:Ni=50:50 or Fe:Ni=80:20.

Figures 18A, 18B:
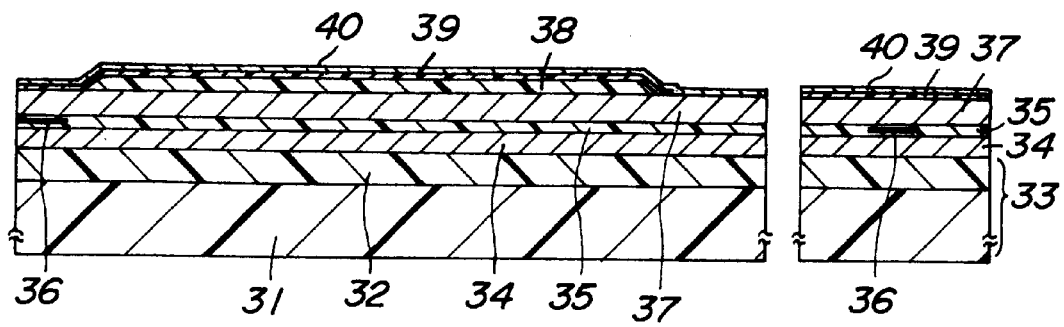

Furthermore, in order to isolate the magnetic layer 37 from a thin film coil to be formed later and to suppress a leakage of a magnetic flux, an insulating layer 38 made of a silicon oxide is formed on the magnetic layer 37 with a thickness of about 0.5–2 $\mu$m as illustrated in FIG. 18. In the present embodiment, the insulating layer 38 is made of a silicon oxide, but it may be made of an inorganic insulating material such as alumina and silicon nitride.

Next, as depicted in FIG. 18, a write gap layer 39 made of an alumina and having a thickness of 0.1–0.3 $\mu$m is formed on an exposed surface of the magnetic layer 37 and inorganic insulating layer 38 in accordance with a given pattern. Then, on this write gap layer, is formed a seed layer 40 made of an electrically conductive magnetic material with a thickness of 50–80 nm. In this embodiment, the seed layer 40 is made of a permalloy (Ni 80%:Fe 20%)having a high saturation magnetic flux density, but it may be made of a magnetic material having a high saturation magnetic flux density as well as a high electrical conductivity such as permalloy (Ni 50%:Fe 50%), iron nitride (FeN) and amorphous Fe—Co—Zr.

Figures 19A, 19B:
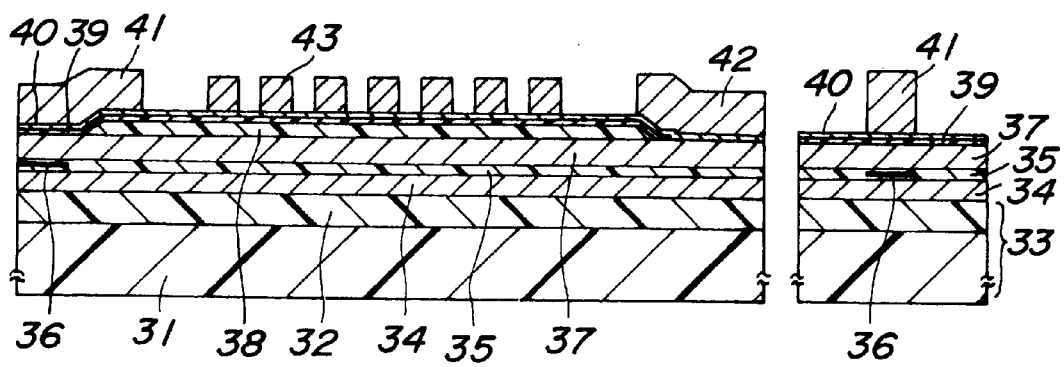

Next, after forming a photoresist mask on the seed layer 40 made of the magnetic material having a high saturation magnetic flux density such that said photoresist mask covers a portion of the seed layer except for a portion at which a pole chip has to be formed, a magnetic material layer 41 having a thickness of 3–4 $\mu$m and extending from the pole portion of the magnetic layer 37 to an upper portion of the inorganic insulating layer 38 is formed by electroplating a permalloy (Ni 80%:Fe 20%) as shown in FIG. 19, while the seed layer 40 is used as one of the electrodes. The pole chip is constituted by the seed layer 40 and magnetic material layer 41, but for the sake of explanation, the magnetic material layer 41 is called a pole chip. During the formation of the pole chip 41, a connecting magnetic layer 42 coupled with the magnetic layer 37 is formed. Subsequently, after forming a separate photoresist mask having such a pattern that a portion except for a portion at which a thin film coil is to be formed is covered with the photoresist mask, an electrically conductive material layer 43 having a thickness of 2–3 $\mu$m is formed by electroplating a copper, while the seed layer 40 is used again as one of the electrodes. The thin film coil is consisting of the seed layer 40 and the electrically conductive material layer 43, but the electrically conductive material layer is called a thin film coil for the sake of explanation.

Figures 20A, 20B:
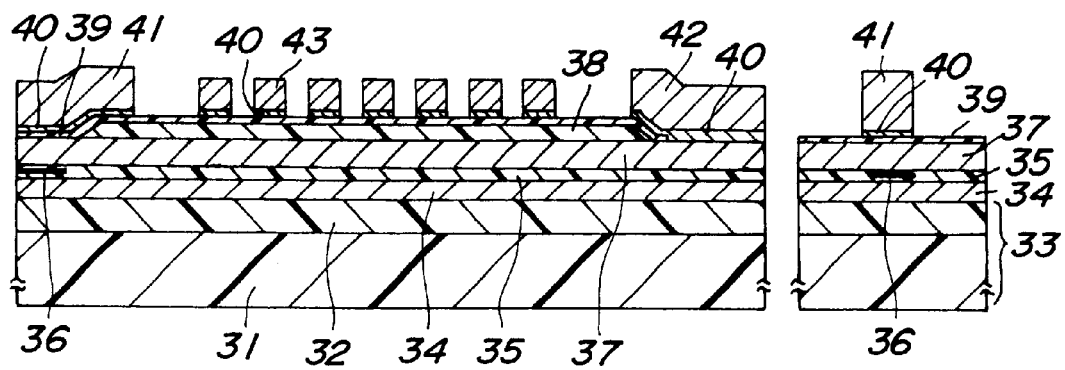

Next, after removing the photoresist mask, exposed portions of the seed layer 40 are removed by the ion beam milling using an argon gas as shown in FIG. 20. By removing the seed layer 40, respective coil windings of the thin film coil 43 arc electrically isolated and at the same time, are isolated from the pole chip.

Next, as illustrated in FIG. 21, a portion of the write gap layer 39 in the vicinity of the pole chip is selectively removed by the reactive ion etching using a Freon gas such as $CF_4$ and $SF_6$, or a chlorine gas such as $Cl_2$ and $BCl_2$ to expose the underlying magnetic layer 37, while the pole chip 41 is used as a mask. Then, the exposed magnetic layer 37 is etched over a depth of about 0.5 $\mu$m by the ion beam etching using an argon gas to form the trim structure.

In the present embodiment, since the insulating layer 38 is made of an inorganic insulating material, an edge position of the insulating layer is not shifted during the reactive ion etching and the following ion beam milling for forming the trim structure. Therefore, the manufacturing yield and durability can be improved. Moreover, since the edge position of the insulating layer 38 defining the reference position of throat height zero is not shifted during the manufacturing process, the throat height can be formed to have a given design value.

Next, after forming an insulating layer 44 made of an alumina such that the thin film coil 43 is supported in an insulating and isolated manner, a surface is flattened by CMP as illustrated in FIG. 22. In this manner, since the insulating layer 44 is made an inorganic insulating material, the pattern of the thin film coil is hardly deformed by heating treatments to be conducted later.

Then, as depicted in FIG. 23, an insulating layer 45 made of a photoresist is formed on the flattened surface of the inorganic layer 44 and is flattened by heating. Next, a second layer thin film coil 47 is formed by depositing a copper on the seed layer 46 by the electroplating, and furthermore an insulating layer 48 made of a photoresist is formed and its surface is flattened by heating.

Next, a yoke portion 49 is formed with a thickness of 3–4 $\mu$m in accordance with a given pattern such that a front end on the side of the air bearing surface is connected with a rear portion of the pole chip 41 and an end portion remote from the air bearing surface is connected to the magnetic layer 37 by means of the connecting magnetic layer 42, and an overcoat layer 50 made an alumina is deposited on a whole surface with a thickness of 20–30 $\mu$m. According to the invention, since the end face of the yoke portion 49 is retarded from the end face of the pole chip 41 on the side of the air bearing surface, a magnetic flux leaked from the end face of the yoke portion hardly affect record tracks.

The yoke portion 49 may be made of a normal permalloy or a magnetic material having a high saturation flux density such as permalloy (Ni 80%:Fe 20%), permalloy (Ni 50%:Fe 50%), iron nitride (FeN) and amorphous Fe—Co—Zr.

As explained before, in the actual manufacturing process of the thin film magnetic head, after dividing the wafer into bars each including a number of thin film magnetic heads, a side wall of a bar is polished to form the air bearing surfaces of these magnetic heads. In the present embodiment, as shown in a plan view of FIG. 25 as well as in a perspective view of FIG. 26, a recessed portion 38a is formed in a portion of the inorganic insulating layer 38 opposing to the air bearing surface such that the pole portion is surrounded by the recessed portion, and the air bearing surface is polished on the basis of the reference position of throat height zero TH=0 defined by an inner edge 38b of the recessed portion. This inner edge 38b of the recessed portion 38a of the inorganic insulating layer 38 is not shifted during the manufacturing process, and therefore the throat height having a designed value can be easily obtained. It should be noted that in FIGS. 25 and 26, the overcoat layer 50 is omitted for the sake of clarity.

The present invention is not limited to the embodiment explained above, but many alternations and modifications may be conceived by those skilled in the art. For instance, in the above mentioned embodiment, the reading magnetoresistive type thin film magnetic head is provided on the substrate and the writing inductive type thin film magnetic head is stacked on the reading magnetic head, but according to the invention this stacking order may be reversed. In the above embodiments, the magnetoresistive element is formed by the GMR element, but it may be formed by the AMR element.

Moreover, according to the invention, the reading thin film magnetic head is not limited to the magnetoresistive element, but may be formed by any other thin film magnetic head. It should be further noted that the reading thin film magnetic head is not always necessary, but only the inductive type thin film magnetic head may be provided.

In the thin film magnetic head and the method of manufacturing the same according to the present invention, the pole chip is made a magnetic material having a high saturation magnetic flux density and front end of the yoke portion connected with the pole chip is retarded from the air bearing surface, and therefore the leakage of a magnetic flux from the end portion of the yoke portion can be suppressed, even when a center of the pole chip is deviated from a center of the yoke portion, a leakage of a magnetic flux from a contact area between the pole chip and the yoke portion can be suppressed, data can be written efficiently on a very narrow track, and the manufacturing yield can be improved.

Since the seed layer serving as the electrode of the electroplating for depositing the magnetic material for the pole chip as well as serving as the electrode of the electroplating for depositing the electrically conductive material for the thin film coil is made of an electrically conductive magnetic material, it is sufficient to conduct only one process of forming the seed layer as well as only one process of removing the seed layer, the manufacturing process is simplified and the manufacturing cost can be reduced.

Furthermore, when the insulating layer whose front end constitutes the reference position of throat height zero is made of an inorganic insulating material, the front end of the inorganic insulating layer is neither retarded nor shifted during the etching process for forming the trim structure, and therefore a portion of the insulating layer just below the top pole is hardly damaged or pealed-off or deviated, and the deterioration in the property of the thin film magnetic head can be prevented. Moreover, since the insulating layer is not pealed-off, an oil or polishing agent might not be remained in a pealed-off portion, and thus the manufacturing yield and durability can be improved.

What is claimed is:

1. A thin film magnetic head comprising:
   a magnetic layer having a pole portion;
   a pole chip whose end surface constitutes an air bearing surface together with said pole portion of the magnetic layer, said pole chip having a width defining a width of a record track;

a yoke portion which is brought into contact with a rear portion of said pole chip apart from the air bearing surface and is magnetically coupled with said magnetic layer at a rear position remote from the air bearing surface;

a write gap layer interposed between said pole portion of the magnetic layer and said pole chip at least at the air bearing surface;

a thin film coil having a portion which is supported in an electrically isolated manner between said magnetic layer and said pole chip and yoke portion; and a substrate supporting said magnetic layer, said pole chip, said yoke portion, said write gap layer and said thin film coil;

wherein said pole chip comprises a seed layer made of an electrically conductive magnetic material and a magnetic material layer, and said thin film coil comprises a seed layer which is made of the same electrically conductive magnetic material as said seed layer of said extra pole chip and is formed by the same manufacturing step with said seed layer of the pole chip.

2. A thin film magnetic head according to claim 1, wherein said electrically conductive magnetic material is a magnetic material having a conductivity as well as a high saturation magnetic flux density.

3. A thin film magnetic head according to claim 2, wherein said electrically conductive magnetic material is selected from the group consisting of FeNi(Ni 80%: Fe 20%), FeNi(Ni 50%:Fe 50%), FeN and amorphous Fe—Co—Zr.

4. A thin film magnetic head according to claim 1, wherein said magnetic material layer constituting the pole chip is a made of a magnetic material selected from the group consisting of FeNi(Ni 80%:Fe 20%), FeNi(Ni 50%: Fe 50%), FeN and amorphous Fe—Co—Zr.

5. A thin film magnetic head according to claim 1, wherein said electrically conductive material layer of the thin film coil is made of a copper.

6. A thin film magnetic head according to claim 1, wherein a portion said magnetic layer which is opposed to said pole chip via the write gap layer is formed to have a reduced thickness to constitute a trim structure.

7. A thin film magnetic head according to claim 1, wherein said thin film coil constitutes a first layer thin film coil and a second layer thin film coil is formed on the first layer thin film coil.

8. A thin film magnetic head according to claim 1, further comprising an insulating layer provided between said magnetic layer and said thin film coil.

9. A thin film magnetic head according to claim 8, wherein said insulating layer is made of a inorganic insulating material.

10. A thin film magnetic head according to claim 9, wherein said inorganic insulating layer has a recessed portion formed therein such that said pole portion of the pole chip is accommodated in the recessed portion.

11. A thin film magnetic head according to claim 10, wherein an inner edge of said recessed portion formed in the inorganic insulating layer constitutes a reference position of throat height zero.

12. A thin film magnetic head according to claim 1, wherein said thin film magnetic head is constructed as a combination type by arranging a magnetoresistive element embedded within a shield gap layer between said substrate and said magnetic layer.

13. A thin film magnetic head according to claim 12, wherein said magnetoresistive element is formed by a giant magnetoresistive element.

14. A method of manufacturing a thin film magnetic head including at least an inductive type thin film magnetic head comprising the steps of:

forming a magnetic layer having a pole portion extending at least from an air bearing surface such that the magnetic layer is supported by a substrate;

forming an insulating layer on a portion of said magnetic layer at which a thin film coil is to be formed, such that an edge of said insulating layer on the side of the air bearing surface defines a reference position of throat height zero;

forming a write gap layer such that a surface of said pole portion of the magnetic layer and a surface of said insulating layer are covered with the write gap layer;

forming a seed layer made of an electrically conductive material on a surface of the write gap layer;

electroplating a magnetic material by using said seed layer as one of electrodes to form a pole chip to be opposed to said pole portion of the magnetic layer via said seed layer and write gap layer;

electroplating an electrically conductive material by using said seed layer as one of electrodes to form a thin film coil above said insulating layer;

removing selectively portions of said seed layer on which said pole chip and thin film coil are not formed;

forming an insulating layer such that said thin film coil is isolated by the insulating layer; and forming a yoke portion on said insulating layer which supports said thin film coil in an insulated and isolated manner, such that the yoke portion is coupled with said pole chip as well as with said magnetic layer at a rear portion opposite to said air bearing surface.

15. A method of manufacturing a thin film magnetic head according to claim 14, wherein after polishing the surface of the insulating layer supporting the thin film coil in an electrically insulating and isolated manner and the surface of the pole chip such that these surface become coplanar, a second layer thin film coil is formed on said thin film coil.

16. A method of manufacturing a thin film magnetic head according to claim 14, wherein after forming said pole chip and thin film coil, a portion of the write gap layer in a vicinity of the pole chip is removed by etching using the pole chip as a mask to expose a surface of a portion of the magnetic layer, and the exposed portion of the magnetic layer is etched over a part of its thickness by using the pole chip and insulating layer as a mask to form a trim structure.

17. A method of manufacturing a thin film magnetic head according to claim 16, wherein said step of removing the write gap layer by the etching using the pole chip as a mask is carried out by a reactive ion etching.

18. A method of manufacturing a thin film magnetic head according to claim 17, wherein said reactive ion etching is performed using a Freon or chlorine gas.

19. A method of manufacturing a thin film magnetic head according to claim 16, wherein said step of removing the surface of the first magnetic layer over a part of its thickness by using the pole portion and insulating layer as a mask is carried out by an ion beam etching.

20. A method of manufacturing a thin film magnetic head according to claim 14, wherein a recessed portion is formed in a portion of said insulating layer on the side of the air bearing surface, and the air bearing surface is formed by using an inner edge of said recessed portion as a reference position of throat height zero.

21. A method of manufacturing a thin film magnetic head according to claim 14, wherein a magnetic shield layer is formed on said substrate, a magnetoresistive element embedded within an shield gap layer is formed on the magnetic shield layer, and said magnetic layer is formed on said shield gap layer to construct the thin film magnetic head as a combination type thin film magnetic head.

* * * * *